United States Patent [19]

Hagenbuch

[11] Patent Number: 4,630,227

[45] Date of Patent: Dec. 16, 1986

[54] APPARATUS AND METHOD FOR ON-BOARD MEASURING OF THE LOAD CARRIED BY A TRUCK BODY

[76] Inventor: LeRoy G. Hagenbuch, 4602 N. Rosemead, Peoria, Ill. 61614

[21] Appl. No.: 604,739

[22] Filed: Apr. 27, 1984

[51] Int. Cl.⁴ .................. G01G 19/08; G06F 15/20
[52] U.S. Cl. .................... 364/567; 177/136; 177/141
[58] Field of Search ............. 364/567, 568, 466, 424, 364/558; 177/136, 141, 211; 73/862.58

[56] References Cited

U.S. PATENT DOCUMENTS

| | | | |
|---|---|---|---|
| 2,756,983 | 7/1956 | Furcini | 177/141 X |
| 3,279,550 | 12/1963 | Kersten | 177/136 |
| 3,306,384 | 6/1966 | Ross | 177/141 |
| 3,321,035 | 5/1967 | Tarpley | 177/136 |
| 3,531,766 | 9/1970 | Henzel | 177/136 |
| 3,545,558 | 12/1970 | Maugh | 177/141 |
| 3,603,418 | 9/1971 | Schmidt et al. | 177/136 |
| 3,669,756 | 6/1972 | Bradley | 177/229 |
| 3,743,041 | 7/1973 | Videon | 177/136 |
| 3,780,817 | 12/1973 | Videon | 177/136 |
| 3,800,895 | 4/1974 | Gale et al. | 177/136 |
| 3,854,540 | 12/1974 | Holmstrom, Jr. | 177/136 |
| 3,878,908 | 4/1922 | Andersson et al. | 177/136 |
| 3,889,767 | 6/1975 | Scott et al. | 177/136 |
| 3,895,681 | 7/1975 | Griffin et al. | 177/141 |
| 3,899,924 | 8/1975 | Klein | 177/136 |
| 3,927,724 | 12/1975 | Baker | 177/136 |
| 3,960,228 | 6/1976 | Nordstrom | 177/136 |
| 3,971,451 | 7/1976 | Norberg | 177/136 |
| 4,020,911 | 5/1977 | English et al. | 177/136 |
| 4,095,659 | 6/1978 | Blench et al. | 177/136 |
| 4,095,660 | 6/1978 | Johansson | 177/136 |
| 4,108,262 | 8/1978 | Anderson | 177/136 |
| 4,123,933 | 11/1978 | Reid | 177/136 |
| 4,148,369 | 4/1979 | Mercer, Jr. | 177/136 |
| 4,178,015 | 12/1979 | Merriman et al. | 280/711 |
| 4,212,074 | 7/1980 | Kuno et al. | 364/567 |
| 4,249,623 | 2/1981 | McCauley | 177/136 |
| 4,328,494 | 5/1982 | Goodall | 177/136 |
| 4,361,198 | 11/1982 | Sjogren | 177/141 |
| 4,384,628 | 5/1983 | Jackson | 177/137 |
| 4,393,951 | 7/1983 | Horst-Rudolf | 177/136 |
| 4,399,881 | 8/1983 | Theurer et al. | 177/137 |
| 4,411,325 | 10/1983 | Hamilton | 177/136 |
| 4,468,968 | 9/1984 | Kee | 364/558 |

FOREIGN PATENT DOCUMENTS 1593993  7/1981  United Kingdom ............... 177/136

OTHER PUBLICATIONS

Brochure for the "Merriman Windjammer" Air/Hydromechanical Actuation by Merriman Products, Inc., Jackson, Michigan.

Contract report prepared by the Bureau of Mines, United States Department of the Interior, directed to "Off-Highway Haulage Truck Overload Detection".

*Primary Examiner*—Gary Chin
*Attorney, Agent, or Firm*—Leydig, Voit & Mayer

[57] ABSTRACT

The invention relates to an apparatus for accurately measuring the weight of a load carried by a truck body which is pivotally mounted on a truck frame. With the truck body in its lowered position, the apparatus is located along an interface between the truck frame with the load carried by the truck body. In order to measure the weight of the load, the apparatus includes pressure sensors which communicate the entire weight of the load to the truck frame. The pressure sensors provide an electrical signal proportional to the pressure exerted by the load on the apparatus. This electrical signal is processed to calculate the weight of the load carried in the truck body. By providing a pressure sensing apparatus at an interface between the load and truck frame, the weight on the load carried by the truck body can be continually monitored without interrupting the loading, hauling and dumping routine.

13 Claims, 17 Drawing Figures

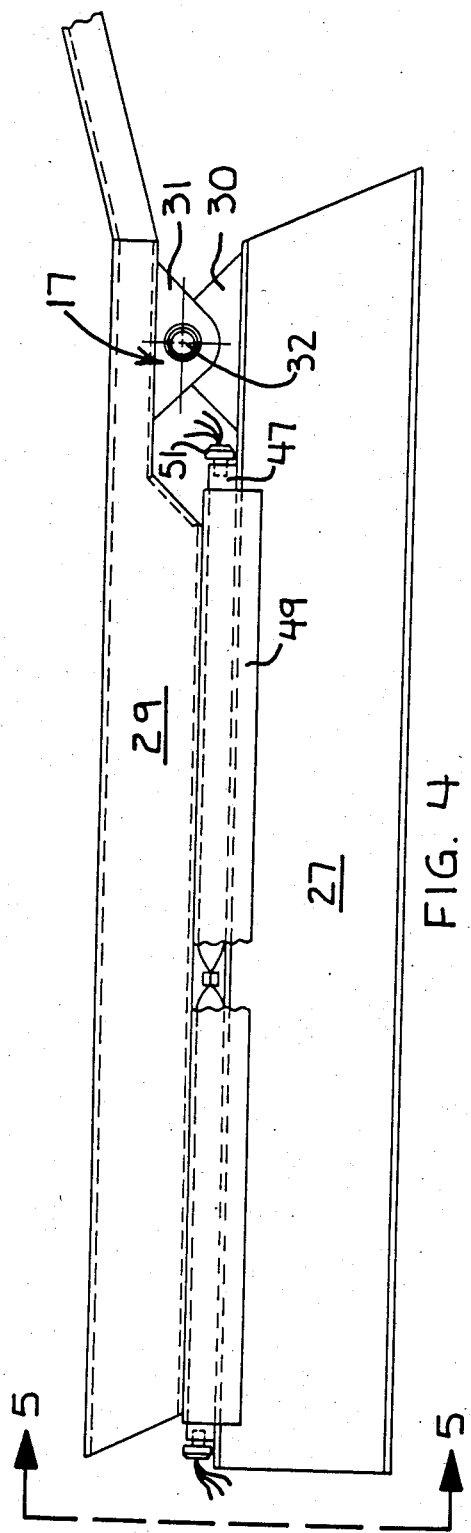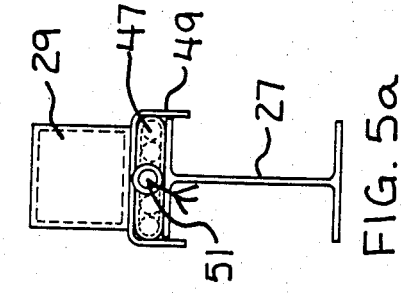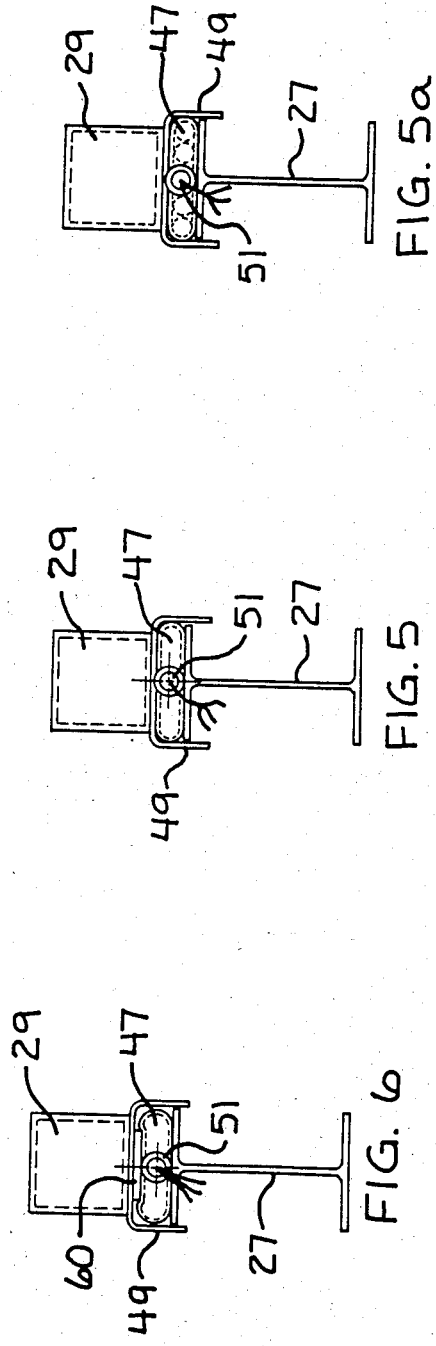

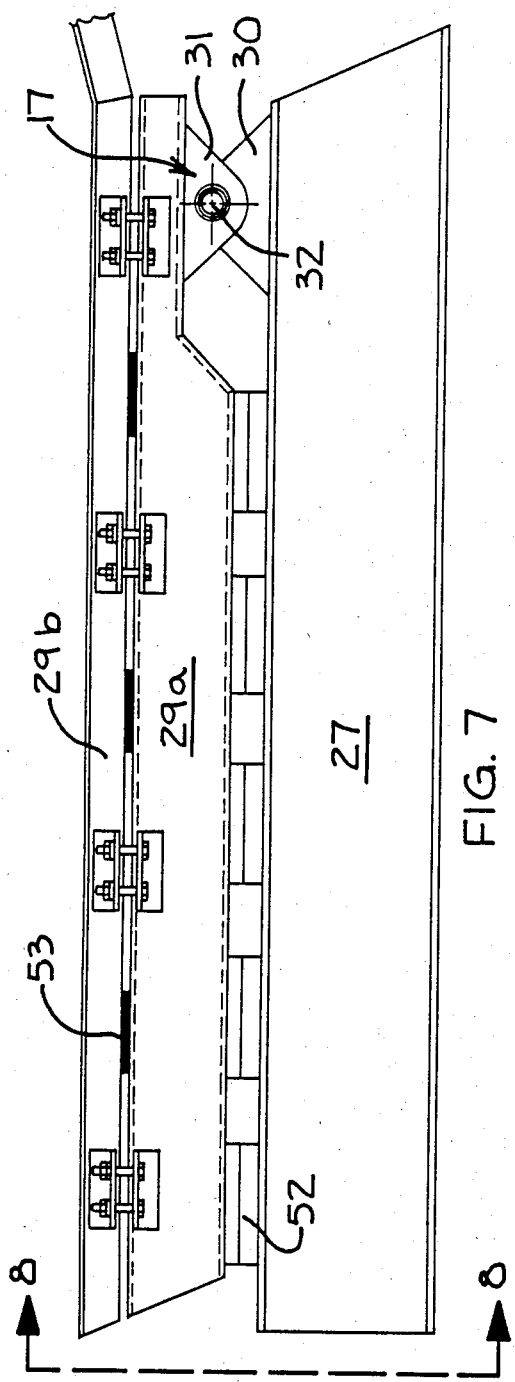
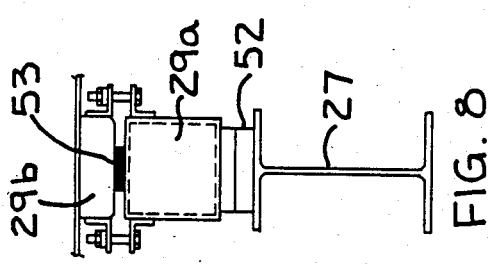
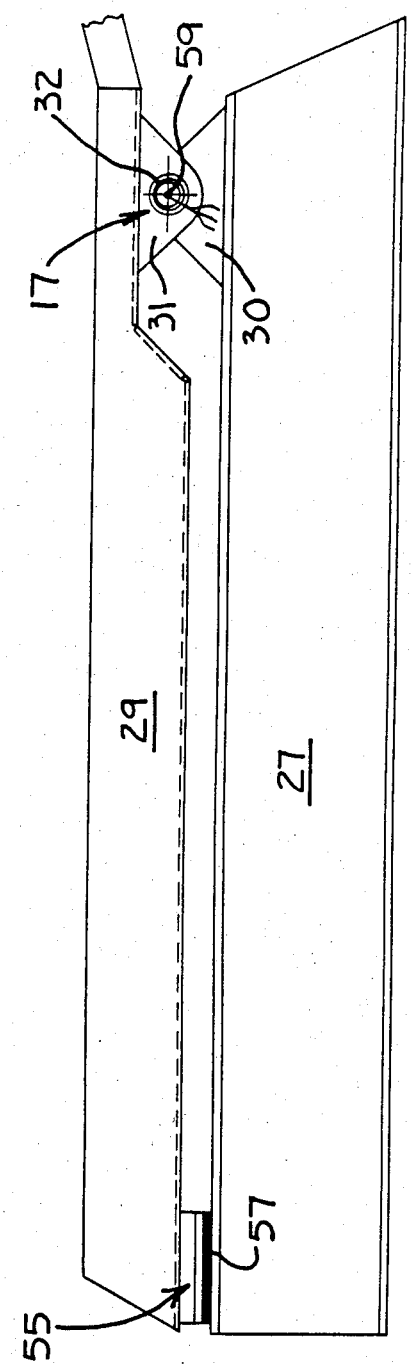

APPARATUS AND METHOD FOR ON-BOARD MEASURING OF THE LOAD CARRIED BY A TRUCK BODY

TECHNICAL FIELD

The invention generally relates to the control of the load of a vehicle and, more particularly, to the monitoring and measuring of a load carried in a truck body wherein the truck body pivots between a load-carrying position and a dump position.

BACKGROUND

Often, off-road trucks are subjected during their routine use to weight loads which differ greatly because of different material density and/or the ability of some material to more tightly pack when loaded into the truck body. As a result, truck bodies which are always filled to their full volume capacity may carry weight loads which exceed the weight capacity of the truck. Repeated occurrences of overloading result in the premature deterioration of the structural integrity of the truck, thus requiring repair or replacement of parts before anticipated. In order to avoid the damage caused by overloading, the truck body can be filled to a volume which assures the truck is not overloaded even for the most dense material. Although underloading may prevent the premature deterioration of the structural integrity of the truck, it sacrifices the truck's load-hauling efficiency. Therefore, an off-road truck which is expensive to operate becomes even more expensive to operate when it is underloaded. Accordingly, there is a need to precisely measure the load carried by an off-road truck. This need has stimulated the development of on-board weighing devices that monitor and measure the truck's load.

Of course, in order to measure the on-board weight of a load carried by a truck, the truck must necessarily incorporate load sensors into its frame and/or body. In a dump-body truck, the body is movable on the truck's frame between a lowered and raised position. To provide for this movement, the body is usually attached to the frame only by a pair of hinge assemblies and a pair of hydraulic cylinders. In one common construction of a dump-body truck, when the truck body is in its lowered position, its entire weight is communicated to the truck frame along a cushioned interface between the truck's frame and body. In this lowered position of the truck body, the hinge assemblies and hydraulic cylinders do not support the weight of the truck body and, therefore, they do not transfer any of the body's weight to the truck frame. By freeing the hinge assemblies and hydraulic cylinders from the weight of the lowered truck body, the amount of stress on these areas is reduced and, accordingly, their useful life is extended.

Traditionally, in order to provide an on-board weighing device for this type of a dump-body truck, load sensors are incorporated into the hinge assemblies and the hydraulic cylinders. Accordingly, in order to measure the load, the truck body must be lifted from its lowered position by the hydraulic cylinders so that the weight of the load is transferred to the frame through the cylinders and the hinge assemblies. Although the accuracy of the load measurements obtained from load sensors associated with the hydraulic cylinders and the hinge assemblies is satisfactory, the structural integrity of the truck may be degraded by modifications of the hinge assemblies and hydraulic cylinders required to incorporate the load sensors.

More important than the structural disadvantage of on-board weighing devices which incorporate load sensors in the truck's hinge assemblies and hydraulic cylinders, is the disadvantage of requiring the truck's body to be lifted off the frame in order to obtain a weight reading. Because this requirement consumes valuable time otherwise available for loading, hauling and unloading, the truck operator is discouraged from weighing the truck load; it is faster to approximate the load. Since the on-board weighing device interferes with an efficient and smooth hauling operation, there is a tendency to not use the weighing device. Therefore, the advantages of on-board weighing devices in dump-body trucks have not been fully realized. Also, the requirement of lifting the truck body off the frame in order to obtain a weight measurement prevents continuous or periodic monitoring of the body's weight.

In order to continuously monitor and measure the load carried by a dump-body truck, it is known to use pressure gauges or similar type load sensors in the truck's suspension. Usually, in these types of weighing devices, the fluid pressure within a hydraulic suspension cylinder is sensed. Because of the relatively short stroke of the cylinder and the relatively large amount of frictional resistance to the cylinder's movement, the pressure reading is not a satisfactorily accurate indication of the truck's weight. In addition, the modification of the truck's suspension to include load sensors opens the possibility of dangerously degrading the suspension system.

SUMMARY OF THE INVENTION

It is a primary object of the invention to provide an apparatus and method for accurately measuring the weight of a truck body when the truck body—pivotally mounted to the truck frame—is located in its lowered position. In this connection, it is also an object of the invention to provide an apparatus and method for periodically measuring the weight of a truck body without interfering with the hauling routine of the truck.

It is another object of the invention to extend the usable life of a dump-body truck by preventing the unnecessary deterioration of the structural integrity of the truck resulting from weight overloading.

It is a further object of the invention to eliminate the inefficient hauling of loads by a dump-body truck which results from the under-utilization of the full weight capacity of the truck.

Other objects and advantages of the invention will be apparent from the following detailed description and the accompanying drawings.

The invention relates to an apparatus for accurately measuring the weight of a load carried by a truck body which is pivotally mounted on a truck frame. With the truck body in its lowered position, the apparatus is located along an interface between the truck frame and the load carried by the truck body. In order to measure the weight of the load, the apparatus includes pressure sensors which communicate the entire weight of the load to the truck frame. The pressure sensors provide an electrical signal proportional to the pressure exerted by the load on the apparatus. This electrical signal is processed to calculate the weight of the load carried in the truck body. By providing a pressure sensing apparatus at an interface between the load and truck frame, the weight on the load carried by the truck body can be continually monitored without interrupting the loading, hauling and dumping routine.

BRIEF DESCRIPTION OF THE DRAWINGS

FIG. 4 is a side view of the preferred embodiment of the on-board weighing device according to the invention, taken along the line 4—4 in FIG. 2;

FIG. 5 is a cross-sectional view of the on-board weighing device according to the preferred embodiment of the invention, taken along the line 5—5 in FIG. 4;

FIG. 5a is a cross-sectional view of a first modification to the preferred embodiment for the on-board weighing device according to the invention, taken along the line 5—5 in FIG. 4;

FIG. 6 is a cross-sectional view of a second modification to the preferred embodiment for the on-board weighing device according to the invention, taken along the line 5—5 in FIG. 4;

FIG. 7 is a side view taken along the line 4—4 in FIG. 2 showing a first alternative embodiment of the on-board weighing device according to the invention;

FIG. 8 is a cross-sectional view of the first alternative embodiment of the on-board weighing device, taken along the line 8—8 in FIG. 7;

FIG. 9 is a side view taken along the line 4—4 in FIG. 2 showing a second alternative embodiment of the on-board weighing device according to the invention;

While the invention will be described in connection with a preferred embodiment and certain alternative embodiments, it will be understood that it is not intended to limit the invention to those particular embodiments. On the contrary, it is intended to cover all alternatives and equivalents as may be included within the spirit and scope of the invention as defined by the appended claims.

DESCRIPTION OF THE PREFERRED EMBODIMENT

Figure 1:
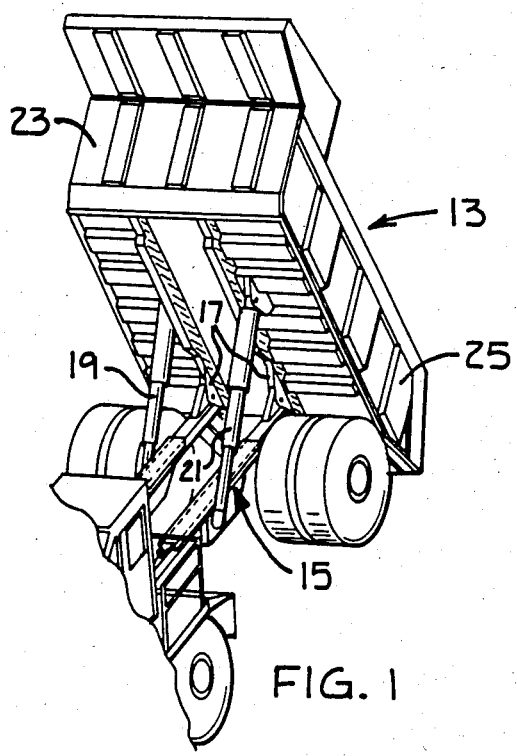
FIG. 1 is an elevated perspective view of a dump-body truck with the truck body in a raised or dump position so as to expose the on-board weighing device according to the preferred embodiment of the invention.

Turning to the drawings, and referring first to FIG. 1, an exemplary off-road truck 11 includes a truck body 13 which is hinged to the truck frame 15 at hinge assemblies 17. By controlling the extension of telescoping hydraulic cylinders 19 and 21, the truck body 13 is pivoted between a fully inclined or dump position and a lowered or rest position. One end of each hydraulic cylinder 19 and 21 is fastened to a hinge assembly located on the bottom of the truck body 13. The opposing end of each cylinder 19 and 21 is fastened to an articulation on the truck frame 15. Structurally, the truck body 13 consists of steel panels 23, which form the shape of the body, and beams 25 which provide the body's structural framework. Since other dump-body trucks may also use the on-board weighing device of this invention, the truck in FIG. 1 is intended as an exemplary truck frame and truck body utilized in connection with the invention.

Often, off-road trucks, such as the one shown in FIG. 1, are very large. For instance, it is not uncommon for the truck's tire diameter to be as great as the height of an average man. Accordingly, the tremendous size of these trucks makes them expensive to operate and repair. Since these trucks represent both a large capital investment and a large operating expense, preventing both overloading of the truck body and under-utilization of the truck's load capacity (i.e., underloading) are important considerations in insuring the truck is operated in the most profitable manner. In particular, if the truck is overloaded it will tend to have a shorter usable life because of the excessive wear caused by the overloading. On the other hand, if the truck is underloaded, the truck must be operated over a longer period of time, thereby consuming more fuel and wearing the truck's parts to a greater degree. Therefore, the ability to accurately measure the truck's load is important to the efficient operation of large off-road trucks.

Typically, a front-end loader is used to fill the truck body. Even though the operator of the front-end loader is at an elevated level when operating the loader, he or she is not in a position to see over the edge of the truck body to determine the level of loading. Consequently, it is difficult to exactly control the amount of material loaded into the truck body. Moreover, the density of the material loaded into the truck body often varies over a significant range; therefore, even if it is possible to accurately determine a certain level of loading, a particular level is only a reliable indication of a weight limit when the material is homogeneous and its density is known. Applicant's on-board weighing device allows the load carried by the off-road truck to be accurately measured without interfering with the truck's normal loading, hauling and unloading routine.

Figure 2:
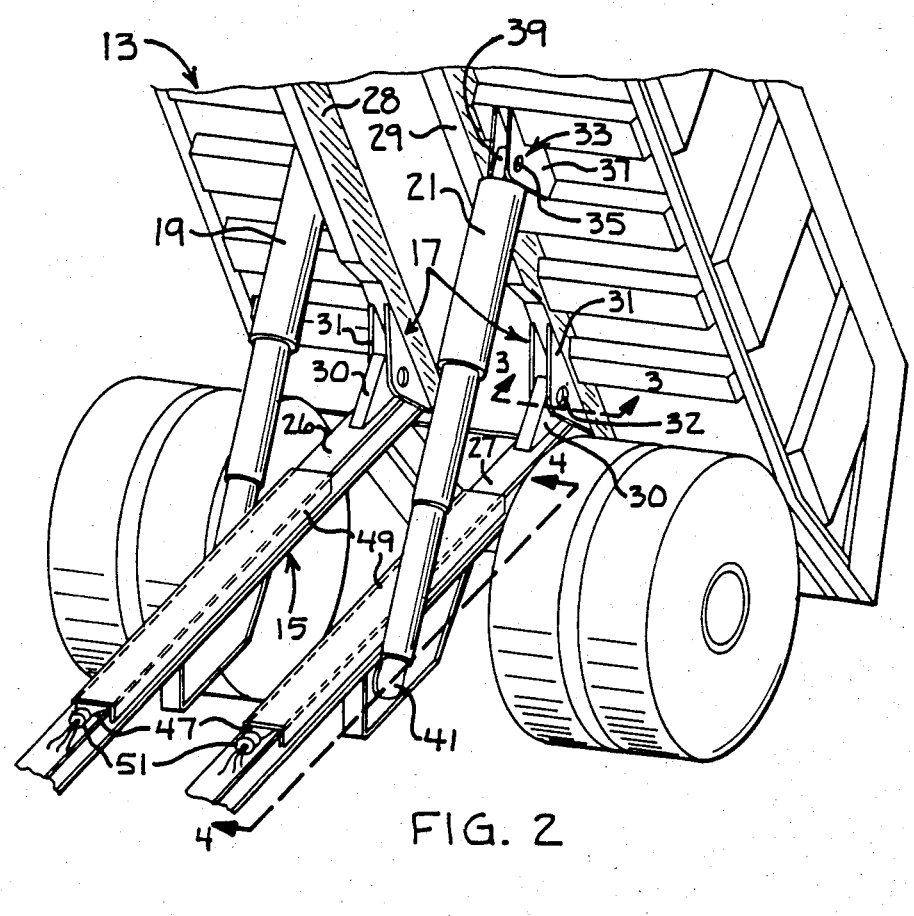
FIG. 2 is an enlarged elevated perspective view of the dump-body truck in FIG. 1 that more clearly shows the on-board weighing device according to the preferred embodiment of the invention.

As most clearly shown in FIG. 2 the truck frame 15 is composed of two parallel beams 26 and 27 connected by transverse beams (not shown) to form a support surface for the truck body 13 over the rear axle of the truck. In order to provide a pivot axis for the truck body 13, each of the hinge assemblies 17 integrally connects one end of each of the parallel beams 26 and 27 to one of beams 28 and 29 on the underside of the truck body. In its lowered position, the beams 28 and 29 of the truck body 13 mate with the beams 26 and 27 of the truck frame 15. As will be more fully explained hereinafter, when the truck body 13 is in its lowered position, the entire weight of the truck body is transferred to the truck frame 15 by way of the interface between the frame's beams 26 and 27 and the body's beams 28 and 29.

Each of the hinge assemblies 17 includes first and second complementary hinge members 30 and 31 which are secured to the frame 15 and body 13, respectively, and interconnected by a pivot pin 32. The hydraulic cylinders 19 and 21 and the truck body 13 are interconnected by hinge assemblies 33. (Only one of the hinge assemblies 33 can be seen in the view of FIGS. 1 and 2). Pivot pins 35 interconnect the complimentary hinge members 37 and 39 of the hinge assemblies 33. Although, as the cylinders extend, the hinge assemblies 33 accommodate the relative repositioning between the hydraulic cylinders 19 and 21 and the truck body 13, articulating assemblies 41 (only one is shown in FIGS. 1 and 2), which connect the cylinders to the truck frame 15, allow a similar relative repositioning between the hydraulic cylinders and the truck frame 15.

Ordinarily, cushioning support material (not shown) is added along the length of the two parallel beams 26 and 27 of the truck frame 15 so when the truck body 13 is in its lowered position the material provides a cushioned interface between the beams 28 and 29 of the truck body and the beams 26 and 27 of the truck frame. In order to evenly distribute the weight of the truck body 13 along the length of the frame 15 and thereby provide the best possible weight distribution for the frame, the cushioning support material is characterized by a thickness dimension which, as explained hereinafter, cooperates with the hinge assemblies 17 when the truck body is moved to its lowered position. The cooperation of the cushioning support material and the hinge assemblies 17 frees the assemblies from supporting any of the truck body's weight when the body is in its lowered position.

Figure 3:
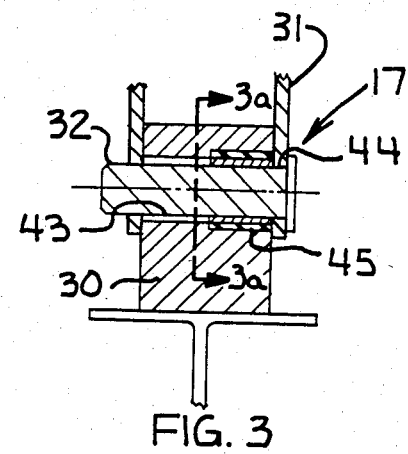
FIG. 3 is a cross-sectional view of one of the truck body hinge assemblies joining the truck body and frame, taken along the line 3—3 in FIG. 2.

Referring now to FIG. 3, in order to free the hinge assemblies 17 from the weight of the truck's load when the truck body is moved to its lowered position, the hinge members 30 include oversized bores 43 (the bores receive the pivot pins 32) which, as explained hereinafter, allow the hinge members 31 to lift the pivot pins 32 into a position which disengages the hinge member 30 from the hinge members 31. By providing the cushioning support material with a thickness dimension greater than the height of the lowermost portion of the oversized bores 43 (as measured from the parallel beams 26 and 27), the engagement of the truck body with the cushioning support material causes the pivot pins 32 securely held by the bores 44 in the hinge members 31, to be lifted off the lower surfaces of the bores. Also, as is well known in the art, when the truck body 13 is moved to its lowered position and the telescoping cylinders 19 and 21 are fully collapsed, the hydraulic cylinders are released to a float position.

Accordingly, when the truck body 13 is moved to its lowered position, the entire weight of the truck body is transferred from the hinge assemblies 17 and hydraulic cylinders 19 and 21 to the body-frame interface provided by the cushioning support material between the beams 26, 27 and the beams 28, 29. It will be appreciated that this cushioning support material is provided by the truck manufacturer in order to (1) cushion the mating surfaces between the beams 28, 29 of the truck body 13 and the beams 26, 27 of the truck frame 15, and (2) provide a surface which lifts the truck's weight off the hinge assemblies 17 when the body is moved to its lowered position, thereby evenly distributing the truck's load along the length of the frame 15. The oversized bores 43 of the hinge members 30 may be lined with a rubber-like material 45 in order to dampen any excessive movement of the pivot pins 32 in the oversized bore.

In accordance with one important aspect of the invention, the cushioning support materials mounted by the manufacturer on the parallel beams 26 and 27 of the truck frame 15 are replaced by lengths of fluid-filled tubings 47 that are laid along the lengths of the parallel beams to provide, when combined with pressure sensors, an on-board weighing device which accurately measures the weight of the truck body 13 while it is in its lowered position. Each of the tubings 47 is capped by an inverted U-shaped metallic shield 49 to protect the tubing at its interface with the truck body 13. The inverted U-shaped shields which protect the tubing are free to move vertically on the parallel beams 26 and 27. At the opposing ends of each of the fluid-filled tubings 47 are pressure sensors 51 which measure the liquid pressure within the tubing. Because the height of the assembly comprising the fluid-filled tubings 47 and the metallic shields 49 is greater than the lowermost portions of the bores 43 in hinge members 30, the pivot pins 32 are lifted off the lowermost portion of the bores 43 when the truck body is moved to its lowered position. Accordingly, when the truck body 13 is lowered onto the parallel beams 26 and 27 of the truck frame, the entire weight of the truck body 13 and its load is transferred to the truck frame 15 by way of the interface provided by the fluid-filled tubings 47. As a result of the fluid-filled tubings 47 supporting the entire weight of the truck body 13 in its lowered position, the increase in liquid pressure sensed by the pressure sensors 51 accurately represents the total weight of the truck body. Not only do the fluid-filled tubings 47 provide a mechanism for measuring the total weight of the load carried by the truck body, they also provide the cushioned support between the truck body 13 and the truck frame 15 previously provided by the cushioning support material.

Generally, the tubings 47 should be composed of material that is resistant to penetration by oil (oil is the most preferred liquid for filling the tubings). More importantly, the tubings 47 must not be susceptible to permanent deformation from the weight of the truck body 13. In particular, the tubings 47 should not include any type of braided wire that might permanently deform under external pressure. An example of a tubing suitable for use in connection with the invention is the JAFIB fire hose manufactured by the Jaffrey Fire Protection Company, Inc. of New Hampshire.

Figure 3A:
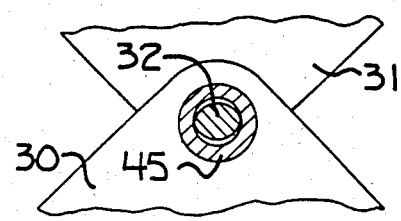
FIG. 3a is a modified pin used in the hinge assemblies of FIG. 3.

It will be appreciated by those familar with off-road trucks that some manufacturers provide a cushioning support material between the truck body 13 and truck frame 15, but they do not provide a means to free the hinge assemblies 17 from supporting a portion of the weight of the truck body when in a lowered position. In accordance with the invention, these types of trucks may be modified to allow all the weight of the body to be supported along the body-frame interface by machining small flat curved surfaces on the tops and bottoms of the pivot pins 32. As illustrated by the modified pin 32 in FIG. 3a, this modification allows the hinge members 30 and 31 to disengage when the truck body is lowered onto the tubings 47, thereby enabling the pressure sensors 51 to measure the pressure from the full weight of the truck body.

In order to calibrate the fluid-filled tubings 47 which support the truck body 13 in its lowered position over the truck frame 15, a liquid of high viscosity (e.g., oil) is pumped into the tubings while the empty truck body is resting on the tubings, i.e., in its lowered position. The pumping of the liquid is stopped when the beams 28 and 29 of the truck body 13 are parallel to the beams 26 and 27 of the frame 15. At this point there is still a slight amount of contact between the pivot pins 32 and the lower portions of the bores 43 in the hinge members 30. Therefore, there is still a slight amount of body weight supported on the frame 15 through the hinge assemblies 17. In order to lift the pivot pins 32 off the hinge members 30, additional liquid is pumped into the tubings 47 until the pivot pins 32 are visually lifted off the lowermost portions of the bores 43. Although there is some downward vertical movement of the inverted U-shaped metallic shields 49 as the truck body 13 is loaded, the movement is not sufficient to cause the pivot pins 32 to re-engage the bores 43 of the hinge members 30.

At each pressure sensor 51 associated with the fluid-filled tubings 47, the liquid pressure is converted to an electrical potential which is delivered to electrical circuitry, discussed hereinafter, to calculate a weight measurement. Referring to FIG. 4, each of the fluid-filled tubings 47 is preferably crimped at its central area in order to provide two separate fluid-filled chambers. By crimping the tubings 47, each pressure sensor 51 at an end of a tubing 47 supplies the electronic circuitry with an independent pressure reading. If desired, the two chambers of each tubing 47 can be joined by a baffle. In alternative configurations of the tubings, each tube can be a unitary piece such as shown in FIG. 5 or it may consist of a plurality of tubings of smaller cross-section as shown in FIG. 5a (these smaller tubes may be innerconnected by baffles). An example of a pressure sensor suitable for use in connection with the invention is the AMETEK LVDT pressure transducer, manufactured by Ametek of Sellersville, Pa.

Referring to FIG. 6, in order to provide an easily ascertainable amount of surface area contact between the fluid-filled tubings 47 and the shields 49, a plate 60 may be secured to the bottom of the channel formed by the shields. The tubings 47 are filled with fluid so as to provide a contact surface along the entire cross-sectional length of the plate 60. Also, the tubings 47 are free from contacting the side walls of the shields 47. By the tubings 47 only contacting the shields 49 along the surface of plate 60, the conversion factor from pressure to weight can be accurately determined.

Referring to FIG. 7, in an alternative embodiment of the on-board weighing device according to the invention, the cushioning support material 52 remains on the parallel beams 26 and 27 to provide a cushioned interface between the truck frame 15 and the truck body 13, but the beams 28 and 29 of the truck body 13 are modified so that they each comprise two sections separated by a series of load sensors. The two pieces 29a and 29b of the beam 29 are joined by a plurality of bolts 57 extending along the length of the two-piece beam. The two pieces of beam 28 (not shown) are constructed and joined in the same manner. By providing a two-piece beam construction with load cells 53 sandwiched between the two pieces, the total weight of the truck's load can be accurately measured without lifting the truck body 13 off the truck frame 15. A particular example of a load cell suitable for use in connection with the embodiment of FIG. 7 is the fatigue-resistant load cell (models 3116 or 3152) manufactured by Lebow Assoc., Inc. of Troy, Mich.

Although this alternative embodiment requires the modification of the truck body 13, there is no required modification of the truck frame 15, and therefore, there is no possibility of a structural weakening of the load's support surface (i.e., the truck frame). Moreover, since the modification of the truck body merely makes two pieces from what formerly was one piece, there is also no danger of reducing the structural integrity of the truck body. Specifically, the weight of the load is distributed through a plurality of load sensors distributed along the length of the interface between the two pieces of the truck body, thereby assuring that there are no high stress areas which might be susceptible to fracturing under heavy loads.

In some vehicle manufacturer's truck designs, when the truck body 13 is in its lowered position the weight of the truck body is supported at the back end of the body by way of the hinge assemblies and at the front of the body by way of a relatively small body-frame interface area. When the body is in its lowered position, the body area intermediate these two support areas is suspended over the frame as shown in FIG. 9. For these types of truck bodies there is no cushioning support material along the length of the parallel beams of the frame. When the truck body is in its lowered position, the interface area 55 supports the truck body 13 on the frame 15 at the end of the body opposite the hinge assemblies 17, thereby preventing the body from being cantilevered. For these types of truck constructions, an on-board weighing device according to the invention is provided by positioning load sensors 57 and 59 at the interface area 55 and at the hinge assemblies 17, respectively, since these are the two points that support the truck body over the truck frame 15 when the body is in its lowered position.

Figure 10:
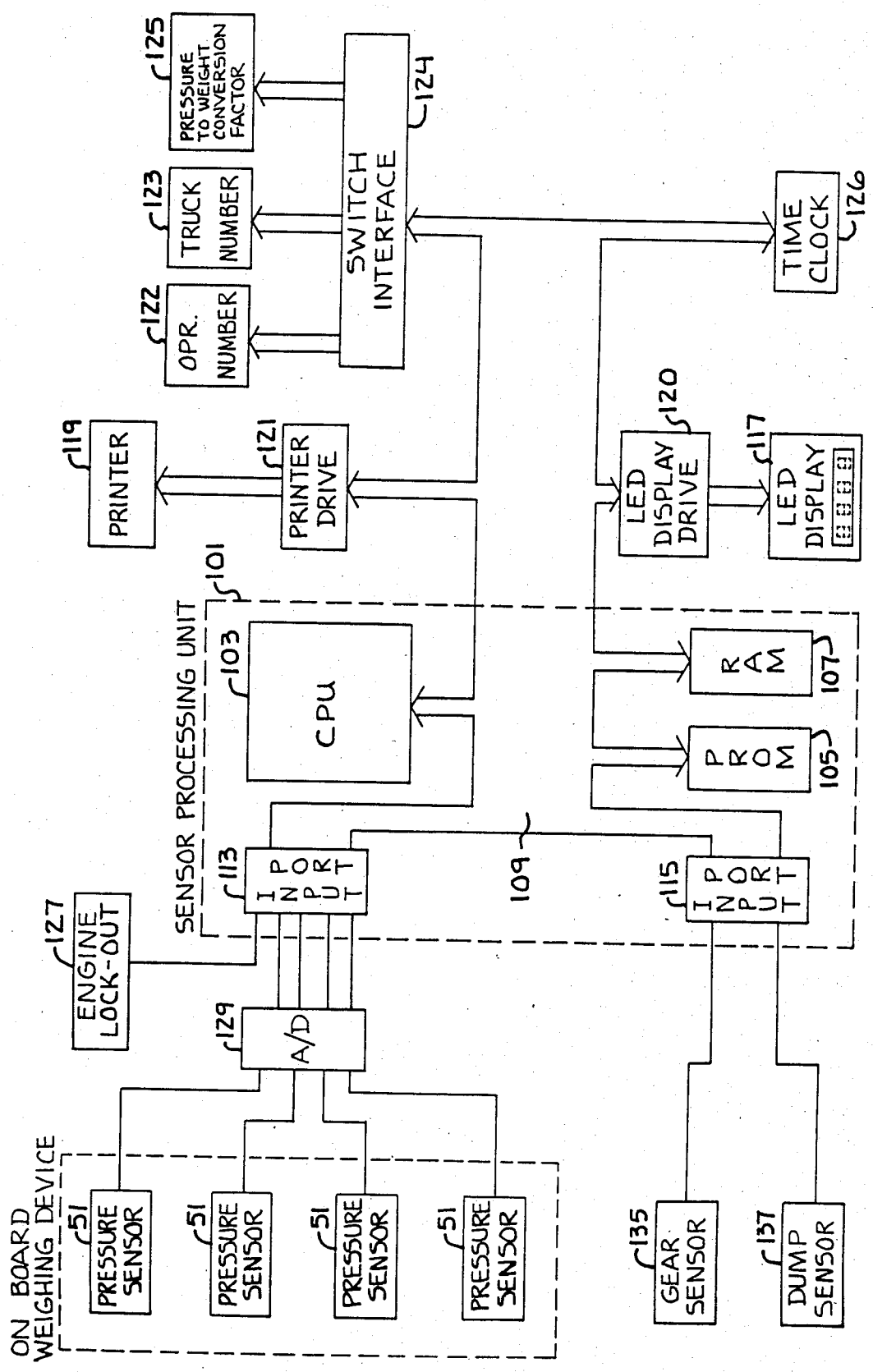
FIG. 10 is a block diagram of the electronic system which receives signals from the on-board weighing device according to the invention.

Referring to FIG. 10, the electrical circuitry which calculates a weight measurement from the electrical potentials delivered from the on-board weighing device is provided by a sensor processing unit 101. Preferably, the unit is microprocessor based. As will be apparent to those skilled in the art, the sensor processing unit 101 includes a central processing unit 103 (hereinafter CPU 103), an associated program memory in the form of a PROM 105 and read/write memory RAM 107. The program memory includes a first memory portion of the RAM 107 that functions as a first storage array (hereinafter referred to as a ARRAY I) and a second memory portion of the RAM which functions as a second storage array (hereinafter referred to as ARRAY II). ARRAY I provides storage locations for a plurality of consecutive net pressure values calculated from the pressure sensors 51 of the on-board weighing device. ARRAY II provides storage locations for a plurality of average net pressure values calculated from the stored values in ARRAY I. The purpose and manipulation of these stored values in ARRAYs I and II will be discussed in connection with the flow-chart of FIGS. 11a–11e.

In conventional fashion, emanating from the CPU 103 is a microcomputer bus 109. The bus 109 is connected to the memories 105 and 107 as well as to input ports 113 and 115. The microcomputer bus 109 communicates to a visual display unit 117 and a printer 119 by way of a display drive 120 and a printer drive 121, respectively. In order to provide the sensor processing unit 101 with the operator and truck number, the microcomputer bus 109 is connected to two sets of thumbwheel switches 122 and 123, respectively, by way of a switch interface 124 respectively. A third set of thumbwheel switches 125 provide the sensor processing unit 101 with a conversion factor for converting the stored pressure readings to weight values in tons, pounds or kilograms. Also, communicating to the sensor processing unit 101 by way of the microcomputer bus 109 is a time clock 126. In order to provide a communication path between the sensor processing unit 101 and the printer 119, the visual display 117, the time clock 126 and the sets of thumbwheel switches 122, 123 and 125, the microcomputer bus 109 includes data lines, memory lines and control lines.

It will be appreciated by those skilled in the art that thumbwheel switches 122 can also serve as an I.D. input for mechanics, oilers and other maintenance personnel in order to record the maintenance work on the truck and the identity of the individual who performed the maintenance. In connection with the idea of recording a user's identification number, the sensor processing unit 101 may control an ignition lock-out device 127 which allows the truck 11 to be started only if a correct I.D. number has been received. As an alternative to the thumbwheel switches 122, a magnetically encoded card could be used by the operator in connection with a card reader.

As will be explained in greater detail in connection with the flow-chart of FIGS. 11a through 11e, the sensor processing unit 101 and its associated electronics are energized in response to engine start-up. An engine start-up energizes the CPU 103 which in turn initializes the program memory, thereby beginning the program routine of the flowchart in FIGS. 11a–11e.

Each of the various alternative embodiments of the on-board weighing device provide the circuitry of FIG. 10 with an analog electrical signal which is linearly proportional to the pressure exerted by the tubing fluid on the device's sensors. Since the pressure of the tubing fluid is linearly proportional to the weight of the truck body and since the sensors reflect the tubing fluid pressure in a linear fashion, the analog signals from the sensors are proportional to the weight of the truck body.

The calibration and programmed operation of the on-board weighing device and the sensor processing unit 101 will be explained with reference to the preferred embodiment of the invention. In connection with the alternative embodiments of the on-board weighing device, the modifications required to calibrate the sensor processing unit 101 and the modifications required to the program memory will be obvious to those skilled in the art from the following detailed description of the calibration and programmed operation of the unit for the preferred embodiment of the invention.

The calibration of the on-board weighing device may be illustrated by considering the case of a truck body 13 having a ten-ton empty weight and a 50-ton load capacity. In the preferred embodiment of the on-board weighing device, if the tubings 47 have a total combined surface area of 500 sq. in., the pressure developed by the empty truck body 13 is 40 psi. A fully loaded truck body 13 (i.e., 50 tons) develops a pressure of 240 psi. By utilizing the pressure sensor 51 in connection with the tubings 47, an analog voltage output may be obtained which accurately measures pressures between 0 and 300 psi. The analog voltage output varies between two and six volts. For the truck body 13 having an empty weight of ten tons and a full load weight of 50 tons, the analog voltage from the sensors 51 is 2.53 volts for the weight of the empty truck body and 5.20 volts for the full load weight. Therefore, the the voltage outputs of the sensors have a voltage range of 2.67 from no load to full load volts.

At the analog-to-digital converter 129 (hereinafter referred to as an A/D converter) the output voltage from each of the pressure sensors 51 is converted from an analog voltage to a digital signal. The output from the A/D converter 129 is a binary-coded decimal number which—since it is proportional to the analog voltage from the pressure sensors 51—is also proportional to the pressure on the tubings 47. Since the voltage output range of the pressure sensors 51 is between two and six volts, the A/D converter 129 converts two volts to a binary-coded decimal number close to zero (when the truck body is lifted off the sensors thereby creating a zero load condition) and correspondingly converts six volts to a binary-coded decimal number of approximately 255.

For the exemplary truck 11 having a ten-ton empty weight for the truck body 13, the foregoing calibration procedure provides, at the binary-coded decimal output of the A/D converter 129, a decimal number of 34 when the truck body is in its lowered position. In comparison to the decimal number of 34 which represents an empty load, for a full load of 50 tons the output of the A/D converter 129 is a binary-coded decimal number of 204. Therefore, a decimal range of 170 represents all truck body loads from empty to full. Therefore, with a pressure range of 200 psi (corresponding to a weight range from no load to full load) a range of 170 in the binary-coded decimal number from the A/D converter 129 gives a resolution of approximately 1.18 psi per decimal number.

In order to calibrate the on-board weighing device for measurement in an appropriate unit of weight (i.e., tons, pounds or kilograms), a 3-digit decimal conversion factor is manually set into the thumbwheel switches 125 in FIG. 10 and converted to a binary-coded decimal number by conventional circuitry associated with the switches. This binary-coded decimal number is delivered to the CPU 103 by way of the input port 113. At the CPU 103, the conversion value is multiplied with a previously calculated net pressure for the truck body. The resulting binary-coded decimal product represents the numerical value of the net weight of the truck body in tons, pounds or kilograms, depending on the conversion factor chosen. For example, the net pressure calculated from the pressure sensors 51 for a full load condition is 170 psi. The CPU 103 multiplies the binary-coded value of 170 by the binary-coded decimal number from the thumbwheel switches 125. For a displayed number in tons, the multiplier would be 0.29; for a displayed number in thousands of pounds, the multiplier would be 0.59; and for a displayed number in thousands of kilograms, the multiplier would be 0.27.

After the program memory in RAM 107 has been initialized by the CPU 103 in response to the sensing of the engine start-up, a pressure is calculated for the empty truck body 13 to provide a tare pressure from which net pressures and weights can be determined. After start-up, the sensor processing unit 101 assumes the first pressure reading to be for an empty load and therefore stores the first reading as the tare pressure. In order to calculate the pressure, the unit (1) reads the binary-coded decimal signals from the A/D converter 129 for each of the pressure sensors 51, (2) averages the readings from the sensors and (3) stores the result as the tare pressure of the truck body 13.

In order to obtain an accurate measurement of the pressure on the four isolated lengths of the tubings 47, the sensor processing unit 101 reads the voltage 16 times in succession from each pressure sensor 51. In order to obtain one pressure value for each sensor 51, the 16 readings are averaged. Each pressure sensor 51 is read and averaged before the next sensor is read and averaged. When all of the pressure sensors 51 have been read and their 16 separate readings averaged, the four average readings are themselves averaged to obtain one pressure measurement for the truck body 13. Since the net weight of the truck body 13 is the weight of interest, the tare pressure reading calculated during the initialization stage of the sensor processing unit 101 (the tare pressure represents the weight of the empty truck body 13), is subtracted from the average pressure reading of the pressure sensors 51 to obtain a net pressure reading. The net pressure reading corresponds to the weight of the load carried by the truck 11 in its truck body 13. This reading is stored in ARRAY I and is manipulated in accordance with the program memory for the CPU 103 contained in the PROM 105.

Referring now to the flowchart of FIGS. 11a–11e, for the purpose of reducing the complexity of the flowchart, the multiple steps required to calculate a single pressure value for the pressure sensors 51 as described above are treated in the steps of the flowchart as a single step. It will be understood, therefore, that each step requiring the sensor processing unit 101 to read the pressure of the truck body requires the voltage signal from each of the sensors 51 to be read in accordance with the following protocol: (1) reading each sensor 16 times in succession, (2) averaging the 16 readings, and (3) averaging the averaged readings from all the sensors in order to obtain a single averaged reading.

Figure 11A:
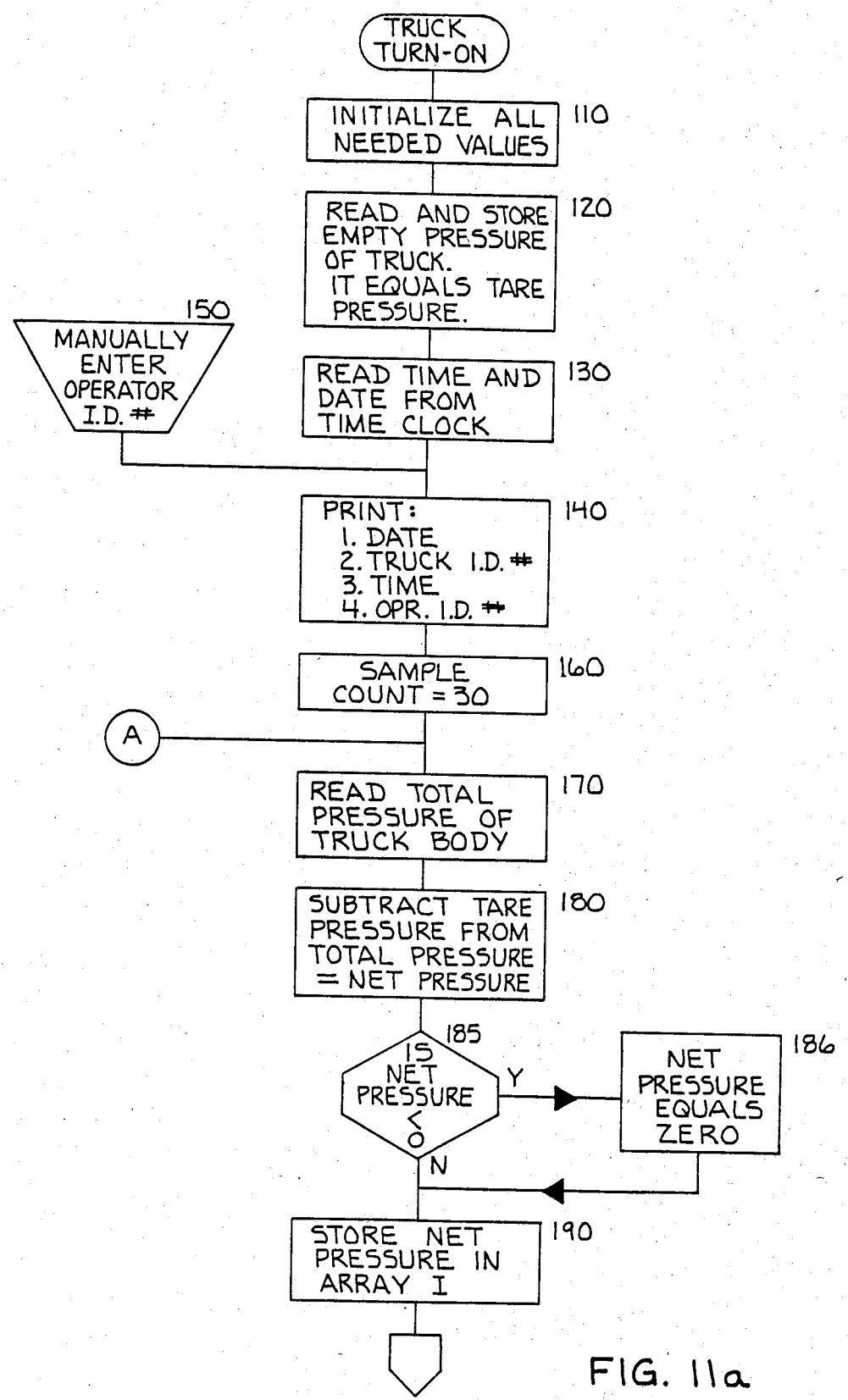
FIGS. 11a–11d are a flowchart diagram for the software utilized in connection with the electronic system of FIG. 10.
Figure 11B:
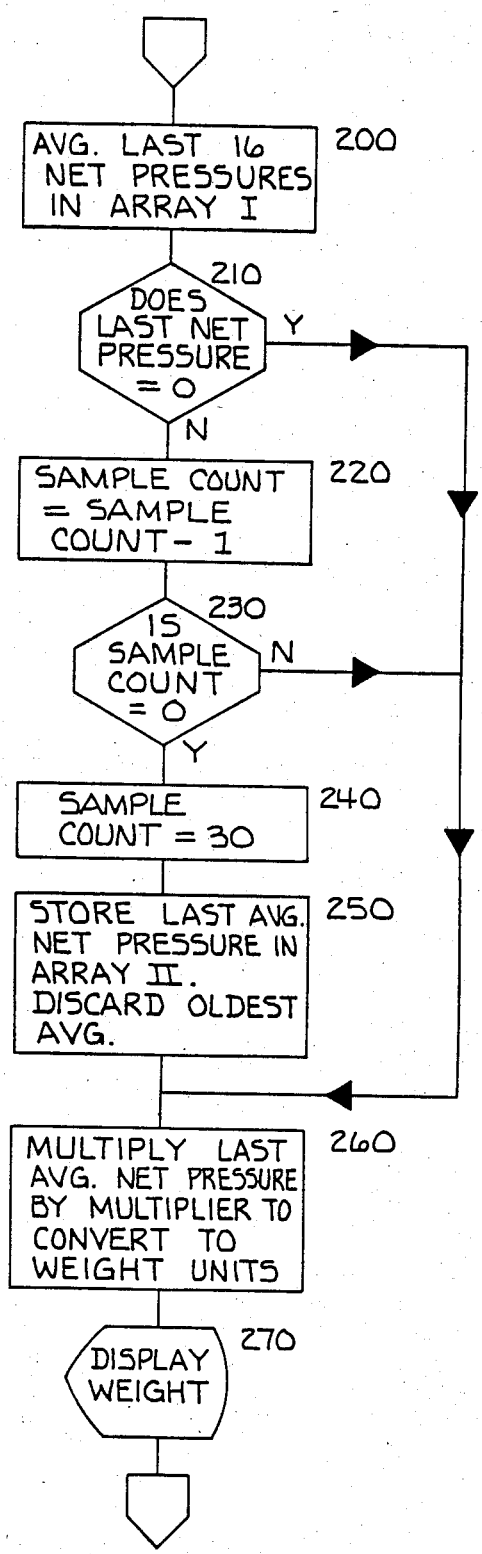
Figure 11C:
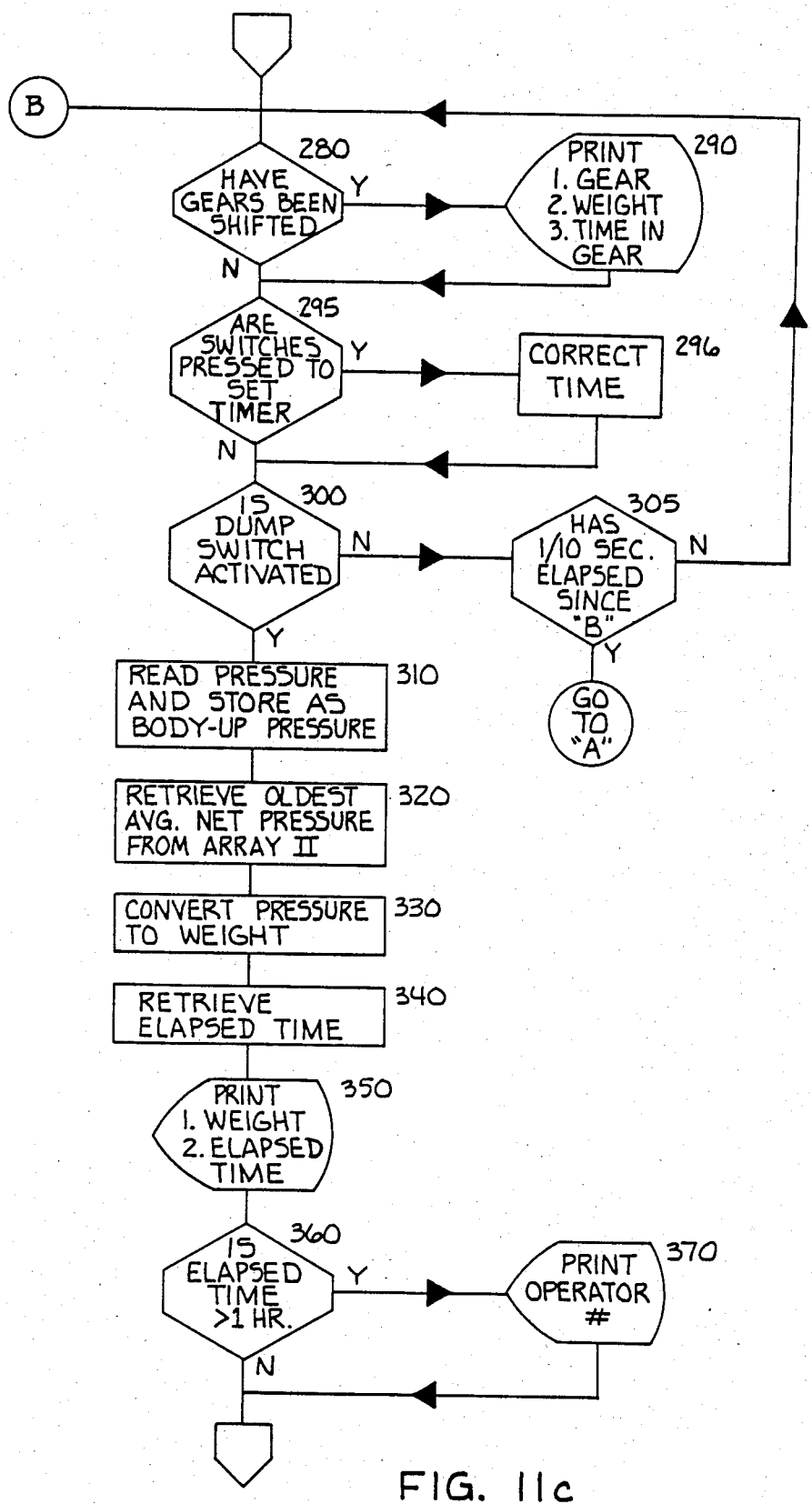
Figure 11D:
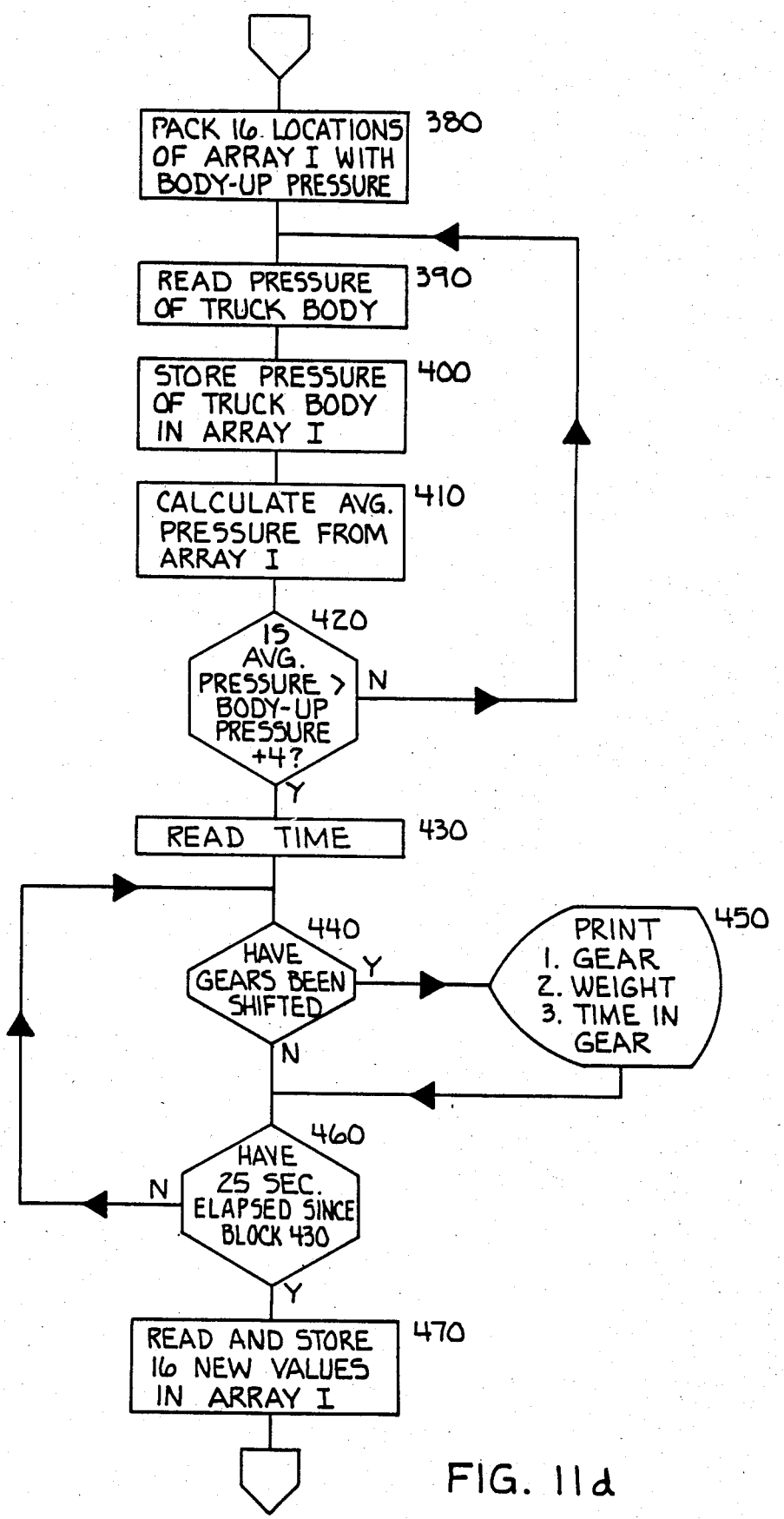
Figure 11E:
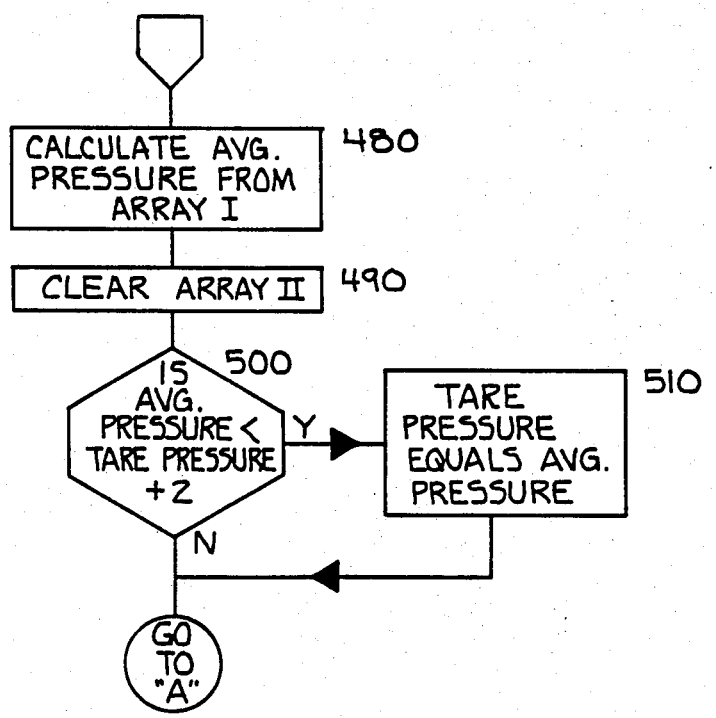

After the truck has been started, the engine start-up sensor 127 signals the sensor processing unit 101 to start its processing at step 100 of the flowchart in FIG. 11a. It begins by initializing required values at step 110. For example, the conversion factor from the thumbwheel switches 125 is calibrated with the unit's power supply and stored in memory.

At step 120, the sensor processing unit 120 reads the pressure on the tubings 47 and stores it as the tare pressure. After the tare pressure has been calculated and stored the sensor processing unit 101 moves to step 130 where it reads the time and date from the time clock 126 of the CPU. Next, as indicated by step 140, the date, truck identification number, time and operator identification number are printed by printer 119. The operator identification number and the truck ID number are obtained from the thumbwheel switches 122 and 123, respectively, as indicated by step 150. At step 160, a sample count is preset in order to control later sequencing of the software as explained more fully hereinafter.

After the truck has been turned on and the sensor processing unit 101 initialized in steps 110 through 160, the program moves to step 170 where the unit reads the pressure from the pressure sensors 51 and calculates an average pressure in the manner previously described. In step 180, the stored value for the tare pressure is subtracted from the average pressure calculated in step 170 in order to obtain a net pressure value. Since the tare pressure represents the weight of the empty truck body, the net pressure represents the weight of the load carried in the truck body 13. From step 180, the sensor processing unit 101 moves to step 185 where it is determined if the net pressure value is less than zero. If the net pressure is not less than zero, the program moves to step 190. But if the net pressure is found to be less than zero, the net pressure is first reset to zero at step 186 before proceeding to step 190. At step 190, the net pressure is stored in a first section of RAM 107 identified as ARRAY I. The most recent 16 net pressure values are stored in ARRAY I. These 16 values are averaged in step 200 (FIG. 11b) in order to obtain a time averaged net pressure.

Since a zero net pressure reading is of no interest to the operator, the flowchart branches at step 210 depending on whether the last net pressure value equalled zero. If the last calculated net pressure value was non-zero, thereby indicating the presence of a load in the truck body, the sensor processing unit 101 decrements the sample count by 1 at step 220 and branches at step 230 depending on whether the sample count equals zero.

Decrementing the sample count is intended to provide a time interval between successive storages into a second section of RAM 107, ARRAY II, of the average net pressure calculated from the values stored in ARRAY I. As explained in greater detail hereinafter, the average net pressure values stored in ARRAY II are used (1) in connection with the weight measurement of the truck body 13 during the dumping of a load and (2) in connection with a hard copy of the truck weight from the printer 119. Since one cycle through the steps of the flow-chart consumes approximately 0.1 seconds (if, as explained hereafter, the dump switch has not been activated), the initial value of 30 for the sample count and the decrementing of that value at step 220 cooooperate to store in ARRAY II once every three seconds the average net weight carried by the truck.

If the sample count is found at step 230 to be equal to zero, the sample count is reset to 30 at step 240 and the most recently calculated average net pressure is stored at step 250 into ARRAY II. For the truck's weight to be displayed, the most recently calculated average net pressure must be converted to a weight measurement. In step 260, the most recently calculated average net pressure is multiplied by the conversion value obtained from the thumbwheel switches 125. After the pressure has been converted to a weight reading in either tons, pounds or kilograms, it is displayed by the visual display unit 117 at step 270.

If the last net pressure reading equalled zero in step 210 or if the sample count is not equal to zero in step 230, the flowchart branches to step 260, thereby bypassing steps 220 through 250 that store into ARRAY II the most recently calculated average net pressure. At step 280, the sensor processing unit 101 determines whether a gear shift has been sensed by the gear sensor 135. If it has, the flowchart branches to step 290 where the sensor processing unit 101 commands the printer 119 to print (1) the gear from which the truck has shifted, (2) the most recently calculated average net weight from ARRAY II and (3) the time spent in the previous gear. If the truck's gears have not been shifted in step 280 or after completion of the printing function by the printer 119 in step 290, the sensor processing unit 101 determines at step 295 whether the operator has indicated the time clock 126 is to be corrected. If the time is to be corrected, the program branches to step 296 where the time correction is executed. From steps 295 or 296, the program moves to step 300 and determines whether the dump sensor 137 has been activated. If the dump sensor has not been activated at step 300, the program branches to step 305 to decide if 0.1 seconds have elapsed since leaving the step 270 and entering step 280. Since step 305 returns the program to step 280 if 0.1 seconds has not elapsed, the delay gives the sensor processing unit 101 an adequate time window for sensing the activation of the dump sensor 137 at step 300 before proceeding further in its program. If 0.1 seconds has elapsed in step 305, the program branches back to step 170 (FIG. 11a) where the pressure from the pressure sensors 51 is determined.

If the dump sensor 137 has been activated, the CPU 103 calculates the net pressure from the pressure sensors 51 in the same way as previously described. As indicated in step 310, the resulting single pressure value is stored in a location designated for storage of a body-up pressure reading (i.e., a pressure reading corresponding to the truck body). By retrieving the oldest average net pressure from ARRAY II at step 320 and converting it to a weight measurement at step 330, the CPU 103 is able to command the printer 119 to print the weight and elapsed time as indicated by step 350. The elapsed time is determined at step 340 in the flowchart. By printing the oldest average net pressure after the dump sensor 137 has been activated, the sensor processing unit 101 provides a hard copy of the truck's load immediately before the load is dumped by the pivoting of the body about hinge assemblies 17. The elapsed time indicates how long it took for this load to be delivered to its destination. Finally, if it is determined at step 360 that the elapsed time is greater than one hour, the CPU 103 commands the printer 119 to record the operator's identification number at step 370.

In order to re-initialize the sensor processing unit 101 after a load has been dumped, the net pressure array, i.e., ARRAY I, is filled at all of its 16 locations with the body-up pressure calculated during step 310. After this "packing" of ARRAY I in step 380, the sensor processing unit 101 reads the pressure at the pressure sensors 51 in step 390 and calculates the net pressure in accordance with the same procedure as previously described. At step 400, that net pressure value is stored in one of the storage cells in ARRAY I, thereby replacing one of the body-up pressures "packed" into the array. From the 16 values in ARRAY I, an average net pressure is calculated at step 410.

At step 420, the sensor processing unit 101 determines if the average net pressure calculated in step 410 is greater than the body-up pressure plus a decimal four. The decimal four is added as a buffer in order to ensure the truck body 13 is lowered onto the tubings 47 before the program progresses to the next step. Since initially at step 420 the ARRAY I is packed with the body-up pressure (except for the one reading obtained and stored during steps 390 and 400, respectively), the average net pressure calculated from ARRAY I is approximately equal to the body-up pressure. Therefore, if the everage net pressure is less than the body-up pressure plus four in step 420, the sensor processing unit 101 returns to step 390 where another pressure reading is made and the resulting net pressure is stored into ARRAY I at step 400. With each storage of a new value in ARRAYs I and II, the oldest value is dropped. In this case, the oldest value in ARRAY I is one of the "packed" body-up pressures. The average net pressure is again calculated at step 410 from the values in ARRAY I and the resulting value is compared to the body-up pressure plus four to determine if the truck body has been lowered onto the tubings 47. Steps 390–420 are repeated until the average net pressure calculated from ARRAY I reaches a value (because of the lowering of the truck body 13) that is greater than the body-up pressure plus four. When this occurs the sensor processing unit 101 will branch from step 420 to step 430 in the flowchart where the CPU 103 reads the current time for use in connection with a later step.

At step 440 the gear sensor 135 is again checked to see if a gear shift has occurred. If it has, the program branches to step 450 where the following information is printed by the printer 119—gear shifted from, most recently calculated average net pressure and elapsed time in the previous gear. At step 460 the sensor processing unit 101 determines if 25 seconds have elapsed since the time read in step 430. If it has not, the program returns to step 440 and the unit 101 again checks to see if there has been a shifting of gears. The delay of 25 seconds implemented at step 460 insures that the truck body 13 has sufficient time to settle on the truck frame 15 before the sensor processing unit 101 continues through its calculations.

After 25 seconds have elapsed, the unit 101 moves forward to step 470 where a new net pressure reading is calculated and loaded into each of the 16 locations of ARRAY I. From the 16 net pressure readings in ARRAY I, a single average pressure reading is calculated at step 480. In order to initialize ARRAY II, step 490 clears the array. At step 500, the sensor processing unit 101 determines if the most recently calculated average net pressure (the pressure calculated at step 480) is less than the tare pressure minus two psi. Since it is possible the truck body 13 held a partial load when the truck 11 was started, a new tare pressure is stored if the new value is found to be two psi less than the original value. Accordingly, if the average pressure is less than the previously calculated tare pressure minus two psi (two is used as an error factor) then the sensor processing unit 101 will replace the previously calculated tare pressure with the most recently calculated average pressure as indicated in step 510. From steps 500 or 510, the sensor processing unit 101 branches back to the beginning of the main loop of the program at step 170, flagged as "A" in the flowchart.

In addition to identifying, calculating and printing different parameters of a hauling cycle as described herein, it will be appreciated that the gathered data may also provide information of daily totals such as, for example, the total tonnage hauled per day, the number of loads hauled per day, the average load hauled on a particular day and the average elapsed time for a haul cycle.

From the foregoing it will be appreciated that an on-board weighing device is provided which provides an accurate measurement of the net weight of the body of a dump-body truck without requiring the modification of the truck's hauling routine. In particular, the on-board weighing device of the invention accurately measures the net weight of a pivotally mounted truck body without requiring the truck body to be lifted off the truck frame. By providing such an on-board weighing device, the net weight of the truck body can be continuously and accurately monitored by a sensor processing unit.

I claim:

1. An apparatus for sensing an indication of the weight of a load carried by a truck body which is pivotally mounted on a truck frame, said apparatus comprising:
   a truck frame including a hinge assembly;
   a truck body pivotally mounted to said truck frame at said hinge assembly, said truck body being pivotally movable on said frame between a lowered position and a raised position;

a substantial length of the surface of said truck frame serving as a support surface for said truck body in its lowered position;

at least one fluid-filled tubing assembly mounted on said substantial length of the surface of said truck frame and forming a continuous interface between said substantial length and a mating portion of said truck body, thereby transferring at least a portion of the weight of said truck body to said frame in a substantially even and continuous distribution along said substantial length; and a pressure sensor assembly in communication with the fluid in said at least one fluid-filled tubing for providing a pressure measurement indicative of the weight of the truck body and its load transferred to said frame along said interface.

2. An apparatus as set forth in claim 1 wherein said truck body is composed of upper and lower sections with said fluid-filled tubing positioned between upper and lower sections so that said tubing fully supports the weight of said load on said lower section when said truck body is in its lowered position.

3. An apparatus as set forth in claim 1 wherein said hinge assembly includes means for decoupling said body and frame at said assembly when said truck body is in its lowered position thereby causing the entire weight of said truck body to be communicated to said truck frame by way of said fluid-filled tubing assembly.

4. An apparatus as set forth in claim 1 wherein said at least one fluid-filled tubing assembly includes fluid-filled tubing supported on said substantial length and covered by a shield, said shield covering said tubing in a manner to (1) allow the transfer of the weight of said truck body to said tubing and (2) allow uninhibited deformation of said tubing in response to the weight of said truck body.

5. An apparatus as set forth in claim 4 wherein said shield includes a predetermined area of contact between said shield and said at least one fluid-filled tubing, thereby accurately providing a pressure within said tubing that is linearly related to the weight of said truck body.

6. An apparatus as set forth in claim 1 wherein said hinge assembly has body and frame portions and also includes means for decoupling said body and frame portions when said truck body is moved to its lowered position such that the entire weight of said truck body is communicated to said truck frame through said fluid-filled tubing assembly.

7. An apparatus as set forth in claim 1 wherein said pressure sensor assembly provides an electrical signal to a processor on board said truck, said processor responding to said electrical signal to provide the truck operator with an indication of the weight of the truck.

8. An apparatus as set forth in claim 7 including a dump sensor mounted to said truck and responsive to the pivoting of said truck body so as to provide said processor with a signal indicative of the dumping of a load by said truck.

9. An apparatus as set forth in claim 8 wherein said processor includes means responsive to said signal from said dump sensor for determining the elapsed time between successive dump signals.

10. An apparatus as set forth in claim 7 including a gear shift sensor for sensing changes in the gears of said truck and providing an electrical signal to said processor in order for the processor to record the gear shifted from, the weight of the load and the time in the previous gear.

11. A method for measuring the weight of a load carried by a truck body pivotally mounted to a truck frame, said truck body being pivoted between lowered and raised positions, said method comprising the steps of:

positioning at least one length of fluid-filled tubing between said truck frame and the load carried by said truck body;

positioning said truck body at its lowered position;

supporting a predetermined portion of the weight of said load on said truck frame and through said fluid-filled tubing such that said tubing continuously and uniformly distributes the weight of said load along at least a substantial portion of the length of said truck frame;

measuring the fluid pressure in said fluid-filled tubing;

converting at least said fluid pressure measurement to a weight value indicative of the entire weight of said load; and indicating to the truck operator the entire weight of the truck's load.

12. An apparatus for the on-board sensing of the load carried in a truck body which is pivotally mounted to a truck frame, said apparatus comprising;

a hinge assembly mounted on said truck frame and coupled to said truck body so as to allow said truck body to pivot between lowered and raised positions;

support means mounted on elongated beams of said truck frame;

said hinge assembly including means for decoupling said body and frame at said assembly when said truck body is in its lowered position, thereby causing the entire weight of said truck body to be communicated to said truck frame by way of said support means;

said support means supporting the entire weight of the truck body in its lowered position in such a manner as to evenly and continuously distribute the entire weight along said interface with none of the weight of the body transferred to the truck frame via said hinge assembly;

said support means includes at least one elongated, inverted U-shaped member and fluid-filled elongated tubings sandwiched between said elongated beams and said U-shaped member, and said elongated inverted U-shaped member serving to shield and protect said fluid-filled elongated tubings from direct contact with a surface of said body; and at least one pressure sensor in communication with the fluid in said fluid-filled elongated tubing for measuring the pressure therein and thereby provide an indication of the weight of the truck body.

13. An apparatus as set forth in claim 12 including a sensor processing unit for determining the weight of the load carried by said truck body from the pressure measured by said pressure sensor.

* * * * *